(12) United States Patent
Nagel et al.

(10) Patent No.: US 12,031,520 B2
(45) Date of Patent: Jul. 9, 2024

(54) WIND TURBINE WITH SEA LEVEL WAVE CHARACTERISTIC DETERMINATION

(71) Applicant: Siemens Gamesa Renewable Energy A/S, Brande (DK)

(72) Inventors: Eirik Nagel, Flensburg (DE); John Nieuwenhuizen, Horsens (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 46 days.

(21) Appl. No.: 17/599,215

(22) PCT Filed: Mar. 13, 2020

(86) PCT No.: PCT/EP2020/056845
§ 371 (c)(1),
(2) Date: Sep. 28, 2021

(87) PCT Pub. No.: WO2020/200696
PCT Pub. Date: Oct. 8, 2020

(65) Prior Publication Data
US 2022/0178350 A1 Jun. 9, 2022

(30) Foreign Application Priority Data

Apr. 1, 2019 (EP) .................................... 19166600

(51) Int. Cl.
*F03D 13/25* (2016.01)
*F03D 7/00* (2006.01)
(Continued)

(52) U.S. Cl.
CPC ............. *F03D 13/25* (2016.05); *F03D 17/00* (2016.05); *G01S 13/9064* (2019.05);
(Continued)

(58) Field of Classification Search
CPC ........ F03D 13/25; F03D 17/00; F03D 7/0276; H01Q 13/20; H01Q 13/203;
(Continued)

(56) References Cited

U.S. PATENT DOCUMENTS 4,025,939 A  5/1977 Aiki et al.
4,053,886 A  10/1977 Wright et al.
(Continued)

FOREIGN PATENT DOCUMENTS

CN  101750610 A  6/2010
CN  102540162 A  7/2012
(Continued)

OTHER PUBLICATIONS

English translation of DE10201205456 by PE2E Jun. 26, 2023.*
(Continued)

*Primary Examiner* — Deming Wan
(74) *Attorney, Agent, or Firm* — Schmeiser, Olsen & Watts, LLP

(57) ABSTRACT

A wind turbine which is configured to be disposed in or above a sea floor is provided. The wind turbine includes a tower configured to protrude from a sea level and having a transmitter configured to transmit an electromagnetic wave to be reflected on the sea level and a receiver configured to receive the reflected electromagnetic wave, wherein at least one of the transmitter and the receiver includes a leaky feeder; and a processing unit being in communication with the receiver and configured to analyse the reflected electromagnetic wave such that a wave characteristic of the sea level is determined.

13 Claims, 6 Drawing Sheets

(51) Int. Cl.
- *F03D 7/06* (2006.01)
- *F03D 17/00* (2016.01)
- *G01S 13/88* (2006.01)
- *G01S 13/90* (2006.01)
- *G01S 13/95* (2006.01)
- *H01Q 1/34* (2006.01)
- *H01Q 13/20* (2006.01)
- *H04B 5/00* (2006.01)
- *B63B 35/44* (2006.01)

(52) U.S. Cl.
CPC ............ *G01S 13/956* (2013.01); *H01Q 1/34* (2013.01); *H01Q 13/20* (2013.01); *B63B 2035/446* (2013.01); *F05B 2240/95* (2013.01); *F05B 2270/30* (2013.01)

(58) Field of Classification Search
CPC .. G01S 13/9064; G01S 13/88; F05B 2260/80; F05B 2270/32; F05B 2270/805; H04B 5/0018
See application file for complete search history.

(56) References Cited

U.S. PATENT DOCUMENTS

| | | | |
|---|---|---|---|
| 5,469,168 A | | 11/1995 | Anderson |
| 9,441,610 B1 * | | 9/2016 | Bachmann ............ G05B 19/042 |
| 2014/0261151 A1 * | | 9/2014 | Ronning ............... A01M 29/10 |
| | | | 116/22 A |
| 2017/0321653 A1 | | 11/2017 | Rebsdorf et al. |

FOREIGN PATENT DOCUMENTS

| | | | |
|---|---|---|---|
| CN | 106291482 A | 1/2017 | |
| CN | 107250534 A | 10/2017 | |
| CN | 108802724 A | 11/2018 | |
| CN | 108885257 A | 11/2018 | |
| CN | 109116320 A | 1/2019 | |
| DE | 102012015456 A1 * | 2/2014 | ............ F03D 17/00 |
| EP | 102012015456 A1 | 2/2014 | |
| EP | 3626965 A1 | 3/2020 | |
| JP | 2011137781 A * | 7/2011 | |
| JP | 2011137781 A | 7/2011 | |
| WO | 2014000744 A2 | 1/2014 | |

OTHER PUBLICATIONS

English translation of JP2011137781 by PE2E Jun. 26, 2023.*
Reichert K et al: "WAMOS II: A Radar Based Wave and Current Monitoring System", Proceedings of the International Offshore and Polar Engineeringconference, International Society of Offshore and Polar Engineers, US, vol. 3; pp. 1-5, XP002666137, ISSN: 1098-6189; Retrieved from the Internet: URL:http://www.oceanwaves.org/download/PDF/ISOPE 99.pdf; [retrieved on Dec. 19, 2011]; pp. 1-3; 1999.
C. Zhao et al., "Wind direction measurements using HF ground wave radars based on a circular receive array", published in 2017 Progress in Electromagnetics Research Symposium, Singapore Nov. 19-22, 2017.
PCT International Search Report and Written Opinion of International Searching Authority dated Jun. 22, 2020 corresponding to PCT International Application No. PCT/EP2020/056845 filed Mar. 13, 2020.
Wikipedia: "Leaky Feeder". Last edited Aug. 24, 2023. Retrieved from Internet Oct. 20, 2023. URL: <https://en.wikipedia.org/wiki/Leaky_feeder>.
Measurement of Residual Stresses in Stainless Steel Expansion Joint by Using X-ray Diffraction Method; Oct. 31, 2011; Chen HaiYun , Sheng ShuiPing, Wu HongJun , Xing Lu; 2011.
Vibration monitoring of wind-turbine blades through optical fiber sensors; G. Cazzulani et al.;Mar. 29, 2018; 2018.
Realistic Rendering of Large-Scale Ocean Wave Scene;Ren Hongxiang, Yin Yong, Jin Yicheng; Dec. 31, 2008; 2008.

* cited by examiner

FIG 7
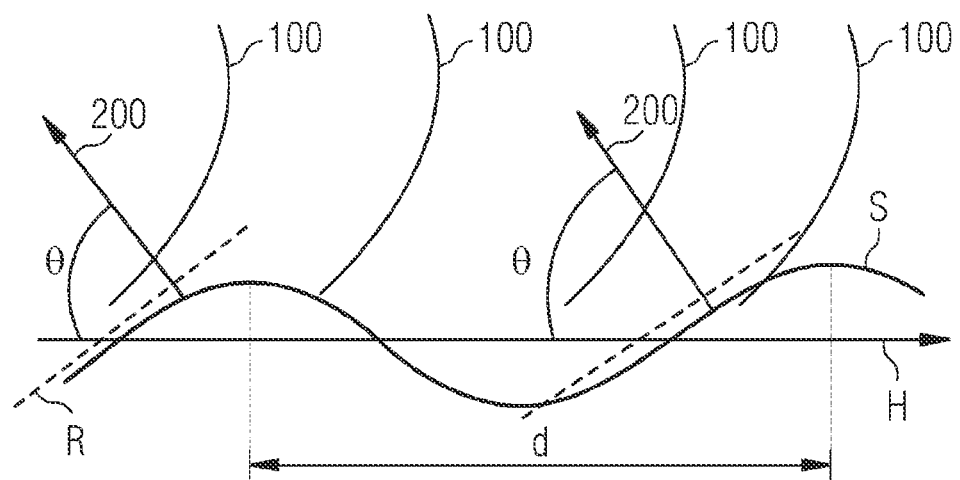
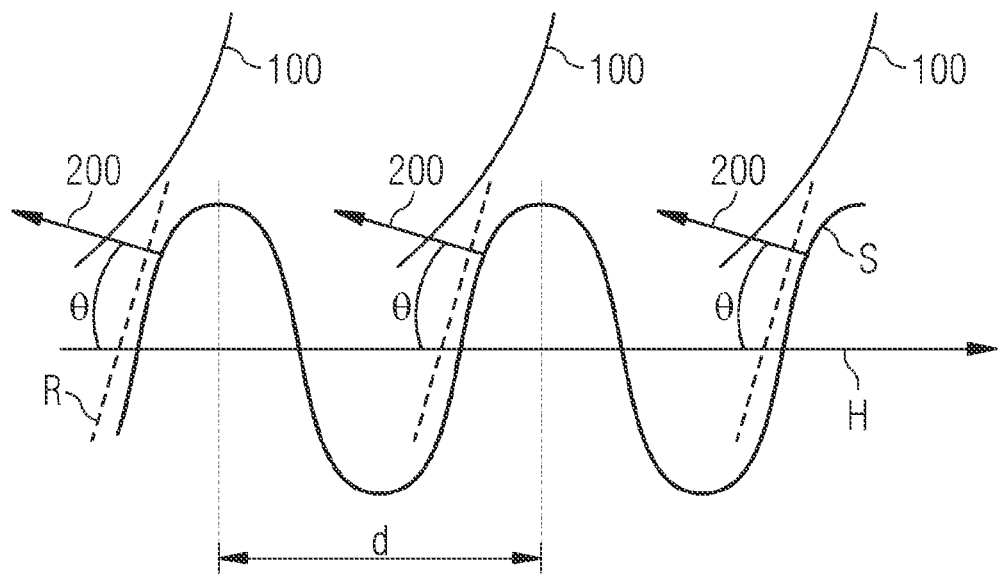

WIND TURBINE WITH SEA LEVEL WAVE CHARACTERISTIC DETERMINATION

CROSS-REFERENCE TO RELATED APPLICATIONS

This application claims priority to PCT Application No. PCT/EP2020/056845, having a filing date of Mar. 13, 2020, which is based off of EP Application No. 19166600.7, having a filing date of Apr. 1, 2019, the entire contents both of which are hereby incorporated by reference.

FIELD OF TECHNOLOGY

The following relates to the technical field of wind turbines. In particular, the following is directed to a wind turbine which is capable to determine a wave characteristic of a sea level where the wind turbine is placed.

BACKGROUND

In the above defined technical field, some radar applications such as LIDAR (Light detection and ranging) and conventional weather measurement stations around a wind turbine were used to measure and predict the wind conditions. However, the accuracy and the robustness of the conventional solutions can still be improved.

SUMMARY

An aspect relates to provide a wind turbine and a method of determining a wave characteristic of a sea level, which are more accurate and more robust.

According to a first aspect of embodiments of the present invention, a wind turbine is configured to be disposed in or above a sea floor and comprises a tower configured to protrude from a sea level and having a transmitter configured to transmit an electromagnetic wave to be reflected on the sea level and a receiver configured to receive the reflected electromagnetic wave, wherein at least one of the transmitter and the receiver comprises a leaky feeder. The wind turbine further comprises a processing unit being in communication with the receiver and configured to analyse the reflected electromagnetic wave such that a wave characteristic of the sea level is determined. The wave characteristic of the sea level can be a height or a speed of a wave in the sea level.

There is a remarkable advantage of the inventive wind turbine that side lobes of an antenna gain pattern can be reduced by the leaky feeders at the turbine tower. Conventionally, the side lobes caused problems in signal processing. Beyond that, the coverage of the leaky feeder can be extended to about 360° around the turbine tower.

The leaky feeders are easy to be installed, robust, sensitive and cheap. For example, the leaky feeder can be made of a cable which is a commercial available cable and easy to handle and to install. There are no optical parts which can pollute.

Beyond that, a closed loop control of the wind turbine can be influenced by the determined wave characteristic of the sea level, in particular if the wind turbine is floating and not ground based.

The leaky feeder is shaped as an arc extending around a circumference of the tower. The arc may extend in a range of at least 360°. The transmitter comprises a first leaky feeder and the receiver comprises a second leaky feeder.

The processing unit is configured to determine at least one of a wind speed, a wind direction, a wind forecast and a ship approximation condition from the determined wave characteristic of the sea level, wherein the ship approximation condition is a condition that allows a ship to approximate or dock at the wind turbine. Also, the processing unit is configured to determine the ship approximation condition from the determined wave characteristic of the sea level and from a load of the ship. Further, the processing unit is configured to determine a target distance between the wind turbine and a ship from the determined wave characteristic of the sea level.

With respect to the ship approximation condition, a decision can be made as to whether or not a ship is able to approximate or land next to a wind turbine, for example with maintenance/service persons. The decision can avoid an unavailing docking of the ship to the wind turbine when the circumstances are not good.

The processing unit is configured to determine the wave characteristic based on an angle of a reflection plane of the sea level with respect to a horizontal. The processing unit is configured to use the Bragg's law $2d \cdot \sin\theta = n \cdot \lambda$, in determining the wave characteristic, where d is either a distance between two wave peaks or a peak-to-peak height of a wave of the sea level, $\theta$ is a scattering angle of the reflected electromagnetic wave with respect to a horizontal, $\lambda$ is a wavelength of the electromagnetic wave, and n is a positive integer.

The leaky feeder can provide a full 360° image around the wind turbine and its support structure such as a mono pile, a floating support structure or any other support structure. For example, SAR (Synthetic Aperture Radar) and/or ISAR (Inverse synthetic-aperture radar) algorithms can be used to obtain 360° high resolution images of the sea level. In particular by the ISAR technology, the movements of individual waves in the sea level can be tracked and used for generating the image.

The following parameters can be derived: a basic sea level height, an individual wave height, a wave distance from the tower, a wave speed, a wave direction, a wave size, a wave shape, a wave acceleration and deceleration, a wave breaking on a wind turbine support structure, a number of waves per distance, etc.

The following radar parameters/principles can be used: TOF (time of flight), Doppler information, Ultra-wide band radar and other radar techniques.

In addition, by the use of SDR (software defined radar), a full sensing of a volume around the wind turbine and/or its supporting structure can be achieved. An SDR is a versatile radar system where most of the processing, like signal generation, filtering, up- and down conversion etc. can be performed and adjusted by software. The SDR can produce any needed modulation scheme optimised for this application. The output power of the SDR can dynamically be adjusted to optimise the range and the spatial resolution. This kind of data capture can support to predict and calculate the mechanical load of the wave forces towards the wind turbine and its support structures. With the knowledge of these loads, the integration of the data in the regulation of the wind turbine can be applied. Furthermore, the generated data be used as secondary data source for a condition monitoring system, for example by means of sensor fusing where sensory data or data derived from disparate sources are combined to reduce an uncertainty.

According to a second aspect of embodiments of the present invention, a method of determining a wave characteristic of a sea level comprises the following steps: providing a tower of a wind turbine, which protrudes from a sea level, with a transmitter configured to transmit an electromagnetic wave to be reflected on the sea level and a receiver configured to receive the reflected electromagnetic wave, wherein at least one of the transmitter and the receiver comprises a leaky feeder; analysing the reflected electromagnetic wave; and determining a wave characteristic of the sea level based on the analysed, reflected electromagnetic wave.

The method further comprising a step of determining at least one of a wind speed, a wind direction, a wind forecast and a ship approximation condition from the determined wave characteristic of the sea level, wherein the ship approximation condition is a condition that allows a ship to approximate or dock at the wind turbine. Also, the ship approximation condition is determined from the determined wave characteristic of the sea level and from a load of the ship.

The method further comprising a step of determining a target distance between the wind turbine and the ship from the determined wave characteristic of the sea level.

The wave characteristic is determined based on an angle of a reflection plane of the sea level with respect to a horizontal. The wave characteristic is determined by use of the Bragg's law $2d \cdot \sin \theta = n \cdot \lambda$, where d is either a distance between two wave peaks or a peak-to-peak height of a wave of the sea level, $\theta$ is a scattering angle of the reflected electromagnetic wave with respect to a horizontal, $\lambda$ is a wavelength of the electromagnetic wave, and n is a positive integer.

Signals for wave characteristics are directly measured by radar to obtain a 360° image around the wind turbine and/or its support structure, in particular by use of synthetic aperture radar, SAR, and/or inverse synthetic-aperture radar, ISAR, algorithms.

A software defined radar, SDR, is used.

The above method can achieve the same advantages like the wind turbine according to embodiments of the present invention.

BRIEF DESCRIPTION

Some of the embodiments will be described in detail, with reference to the following figures, wherein like designations denote like members, wherein:

FIG. 7 shows a principle of analysing a reflected electromagnetic wave such that the wave characteristic of the sea level is determined according to an embodiment of the present invention.

DETAILED DESCRIPTION

Figure 1:
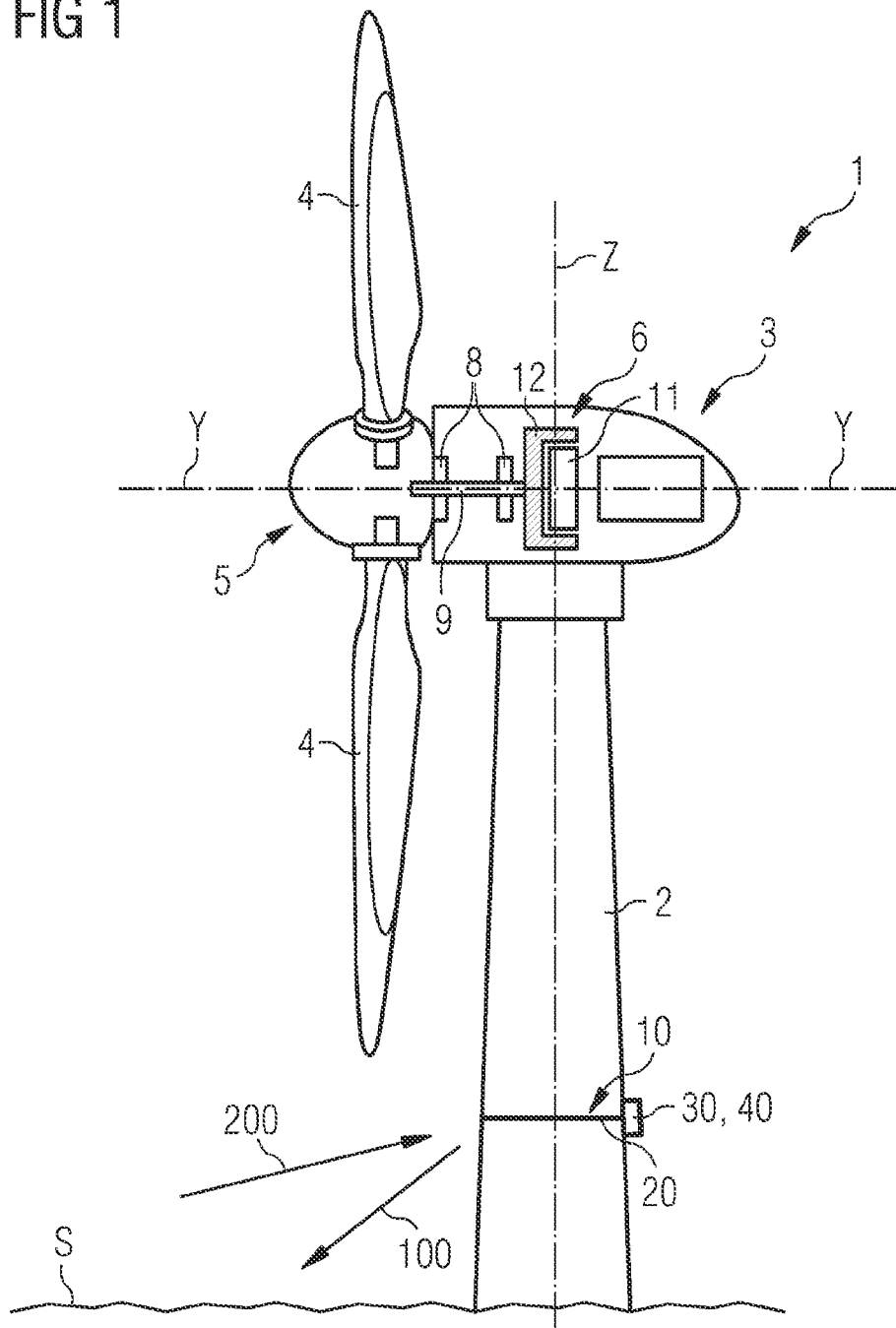
FIG. 1 shows a schematic section of a wind turbine according to an embodiment of the present invention.

The illustrations in the drawings are schematically. It is noted that in different figures, similar or identical elements are provided with the same reference signs.

FIG. 1 shows a schematic section of a wind turbine 1 according to an embodiment of the present invention. The wind turbine 1 is configured to be disposed in or above a sea floor (offshore). The wind turbine 1 is support by a support structure (not shown) like a mono pile or a floating support structure. Any other support structure can be used. The wind turbine 1 comprises a tower 2, which is mounted on a non-depicted fundament to protrude from a sea level S. The wind turbine 1 can also be disposed above the sea floor S in a floating manner. A nacelle 3 is arranged on top of the tower 2. In between the tower 2 and the nacelle 3 a yaw angle adjustment device (not shown) is provided, which is capable of rotating the nacelle around a vertical yaw axis Z. The wind turbine 1 further comprises a wind rotor 5 having one or more rotational blades 4 (in the perspective of FIG. 1 only two blades 4 are visible). The wind rotor 5 is rotatable around a rotational axis Y. In general, when not differently specified, the terms axial, radial and circumferential in the following are made with reference to the rotational axis Y. The blades 4 extend radially with respect to the rotational axis Y. The wind turbine 1 comprises an electric generator 6 having a stator 11 and a rotor 12. The rotor 12 is rotatable with respect to the stator 11 about the rotational axis Y to generate electrical power. The electric generator 6 and the generation of electrical power through embodiments of the present invention is not a specific aspect of embodiments of the present invention and therefore not described in further detail.

Basically, the tower 2 has a transmitter 20, 30 configured to transmit an electromagnetic wave 100 to be reflected on the sea level S and a receiver 20, 40 configured to receive the reflected electromagnetic wave 200, wherein at least one of the transmitter and the receiver comprises a leaky feeder 20. In the embodiment of FIG. 1, the tower 2 has a leaky feeder 20 in which both functions of the transmitter and the receiver are implemented. Other embodiments may use a first leaky feeder for transmitting the electromagnetic wave and a second leaky feeder for receiving the reflected electromagnetic wave, which is described later.

The wind turbine 1 further comprises a processing unit 7 (FIG. 5) being in communication with the receiver 20, 40 and configured to analyse the reflected electromagnetic wave 200 such that a wave characteristic of the sea level S is determined. The wave characteristic of the sea level S can be a height or a speed of a wave in the sea level S. Due to or by a time of flight, an angle of flight and/or a Doppler effect of the reflected electromagnetic wave 200, the processing unit 7 can determine a height and a movement (speed) of a wave of the sea level S. For example, the time of flight $t_{flight}$ of the reflected electromagnetic wave 200 can be calculated as $t_{flight} = d/(2 \cdot c_0)$, wherein $c_0$ is the speed of light. The distance d between the receiver 20, 40 to the wave of the sea level S, where the electromagnetic wave 200 has been reflected, is then calculated as $d = (t_{flight} \cdot c_0)/2$.

The leaky feeder 20 is an elongated component, which leaks the electromagnetic wave 100 along the component. The leaky feeder 20 may be constituted by a leaky coaxial cable or a leaky waveguide or a leaky stripline. The leaky feeder 20 is connected to an electromagnetic transmitter driver 30 in order to transmit a first electromagnetic signal 100 along the leaky feeder 20 towards the sea level. The electromagnetic transmitter driver 30 can comprise or be an HF amplifier. The leaky feeder 20 comprises a plurality of slots to allow the first electromagnetic signal 100 to leak out of the leaky feeder 20 along its entire length towards the sea level S. The slots may be, according to possible embodiments, regularly distributed along the length of the leaky feeder 20. According to other possible embodiments of the present invention, the leaky feeder 20 is a normal coaxial cable with low optical coverage of the outside conductor (mesh or slots/apertures), which also leaks electromagnetic waves.

The leaky feeder 20 may be provided with a heating system (not shown) in case severe over icing conditions are possible. Heating may be provided by air flowing between in and outside conductor or by electrical current which runs in inner or outer conductor of the leaky feeder 20.

The first electromagnetic signal 100 may be, according to possible embodiments, a radar signal such as a multi-frequency radar or LIDAR or an ultrasonic signal. In cases where the first electromagnetic signal 100 is a radar signal or an ultrasonic signal, the leaky feeder 20 is configured as a coaxial leaky cable.

According to other embodiments, particularly where the first electromagnetic signal 100 is of higher frequency, the leaky feeder 20 is configured as a leaky waveguide. In general, according to the different embodiments of the present invention, the first electromagnetic signal 100 may be of any frequency, provided that it can be transmitted to and reflected by the sea level S.

When the first electromagnetic signal 100 impinges the sea level S, the reflected second electromagnetic signal 200 is transmitted towards the leaky feeder 20.

The plurality of slots of the leaky feeder 20 allow the second electromagnetic signal 200 to leak into the leaky feeder 20 towards the electromagnetic converter 40.

The processing unit 7, which is in communication with the electromagnetic converter 40, analyses the second electromagnetic signal 200 (and if necessary the first electromagnetic signal 100) for determining a wave characteristic of the sea level S.

Figure 2:
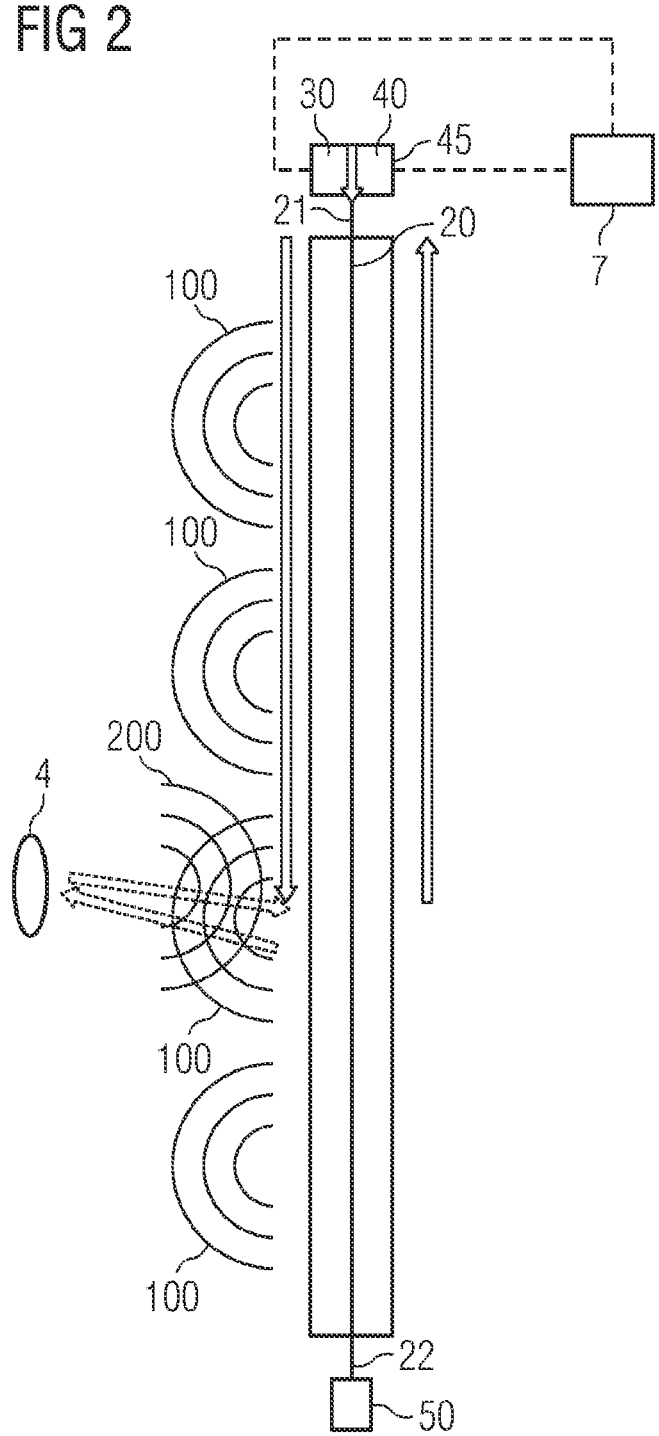
FIG. 2 shows a schematic view of an uncoiled leaky feeder according to an embodiment of the present invention.

FIG. 2 shows a schematic view of an uncoiled leaky feeder according to an embodiment of the present invention. This embodiment uses only the one leaky feeder 20. The leaky feeder 20 extends between a first end 21 and a second end 22. The first end 21 is connected to an electromagnetic transceiver 45 comprising one electromagnetic transmitter driver 30 and one electromagnetic converter 40. The second end 22 is connected to one final resistance 50. According to embodiments of the present invention, the electromagnetic transmitter driver 30 and the electromagnetic converter 40 may be both connected to the first end 21 or to the second end 22 via a signal splitter or y-adapter. According to other embodiments of the present invention, the electromagnetic transmitter driver 30 is connected to the first end 21 and the electromagnetic converter 40 is connected to the second end 22.

In some cases, if a single leaky feeder 20 is used, the determined wave characteristic of the sea level S can have a uncertainty if the electromagnetic transmitter 30 and the electromagnetic receiver 40 are at the same end 21 or 22. Therefore, it is desired that the electromagnetic transmitter 30 is at one end of the leaky feeder 20 and the electromagnetic receiver 40 is on the other end of the leaky feeder 20.

The leaky feeder 20 may not be connected directly to the electromagnetic transmitter driver 30 and to the electromagnetic receiver converter 40, e.g. a non-leaky feeder cable (i.e. a normal coaxial cable) may be interposed between the leaky feeder 20 and the electromagnetic transmitter driver 30 and/or the electromagnetic receiver converter 40. A normal coaxial cable may be connected directly to the electromagnetic transmitter driver 30 and to the electromagnetic receiver converter 40 or it may be used for interconnection.

The leaky feeder 20, which is shown in an uncoiled state in FIG. 2, is geometrically actually configured as an arc of approximately 360° or more.

Figure 3:
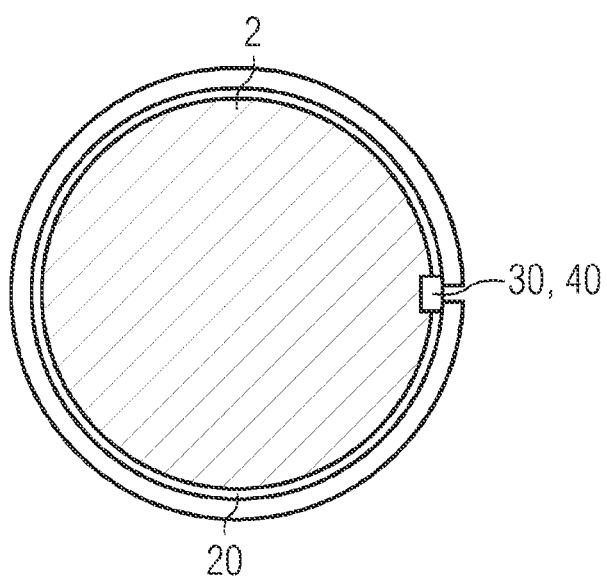
FIG. 3 shows a cross section view of the tower and the leaky feeder according to an embodiment of the present invention.

FIG. 3 shows a cross section view of the tower 2 and the leaky feeder 20 according to an embodiment of the present invention. The leaky feeder 20 is shaped as an arc extending around a circumference of the tower 2, i.e. the leaky feeder 20 is geometrically configured as a circular loop surrounding the tower 2 or the wind turbine support structures. The leaky feeder 20 can thus transmit the electromagnetic wave 100 or receive the reflected electromagnetic wave 200 around an angle of 360°.

According to other embodiments of the present invention, any other geometrical configuration is possible, provided that the first electromagnetic signal 100 can be transmitted towards the sea level S and the second electromagnetic signal 200 can be reflected by the sea level S towards the leaky feeder 20.

The leaky feeder 20 the electromagnetic transmitter driver 30 and the electromagnetic receiver converter 40 are installed on the tower 2. According to other embodiments of the present invention, the leaky feeder 20 the electromagnetic transmitter driver 30 and the electromagnetic receiver converter 40 may be not directly installed on the wind turbine 1, i.e. distanced from the wind turbine 1.

Figure 4:
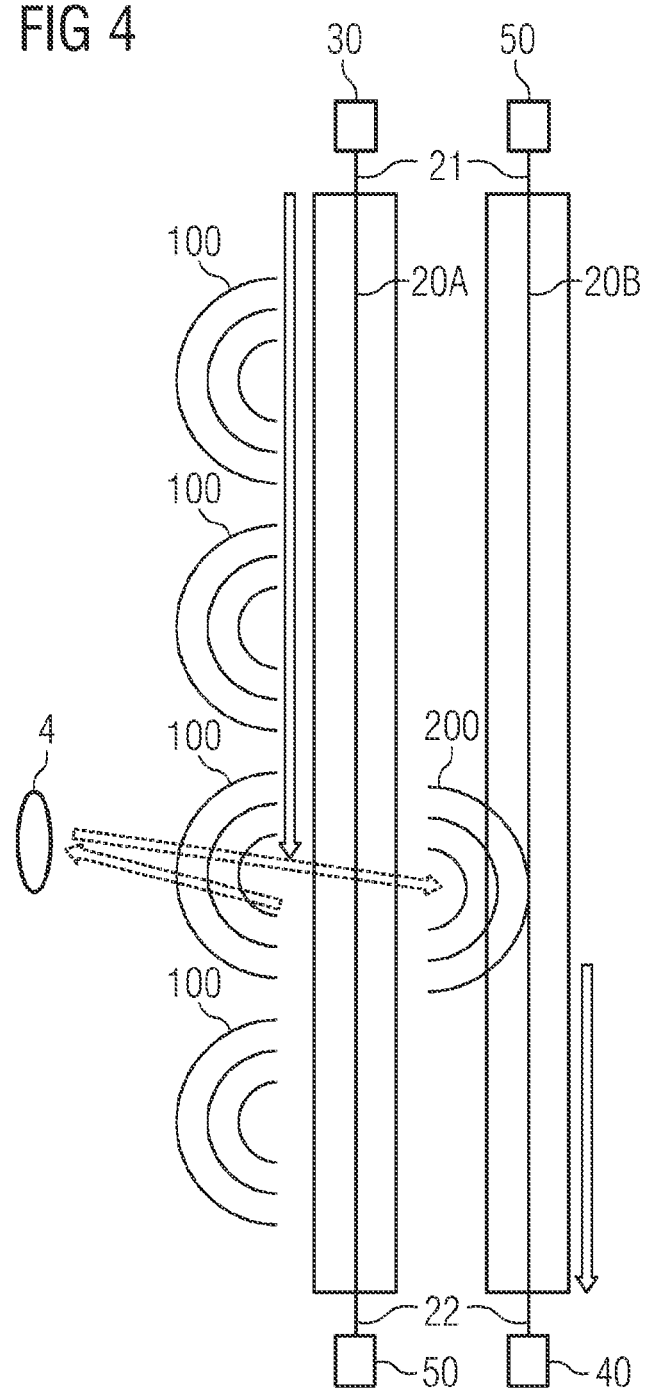
FIG. 4 shows a schematic view of uncoiled leaky feeders according to an embodiment of the present invention, where a plurality of leaky feeders is used.

FIG. 4 shows a schematic view of uncoiled leaky feeders 20A, 20B according to an embodiment of the present invention, where a plurality of leaky feeders 20A, 20B is used. The embodiment of FIG. 4 uses two leaky feeders 20A, 20B being in parallel to each other and extending between respective first ends 21 and second ends 22, respectively adjacent to each other. The two leaky feeders 20A, 20B are configured according to an antiparallel configuration, where a first leaky feeder 20 extends between an electromagnetic transmitter driver 30 connected to the first end 21, and a final resistance 50 connected to the second end 22; while a second leaky feeder 20 extends between a final resistance 50 connected to the first end 21, and an electromagnetic receiver converter 40 connected to the second end 22.

In such embodiment, the first leaky feeder 20A connected to the electromagnetic transmitter driver 30 is dedicated for the transmission of the first electromagnetic signal 100, while the second leaky feeder 20B connected to the electromagnetic receiver converter 40 is dedicated for receiving the first electromagnetic signal 200.

Figure 5:
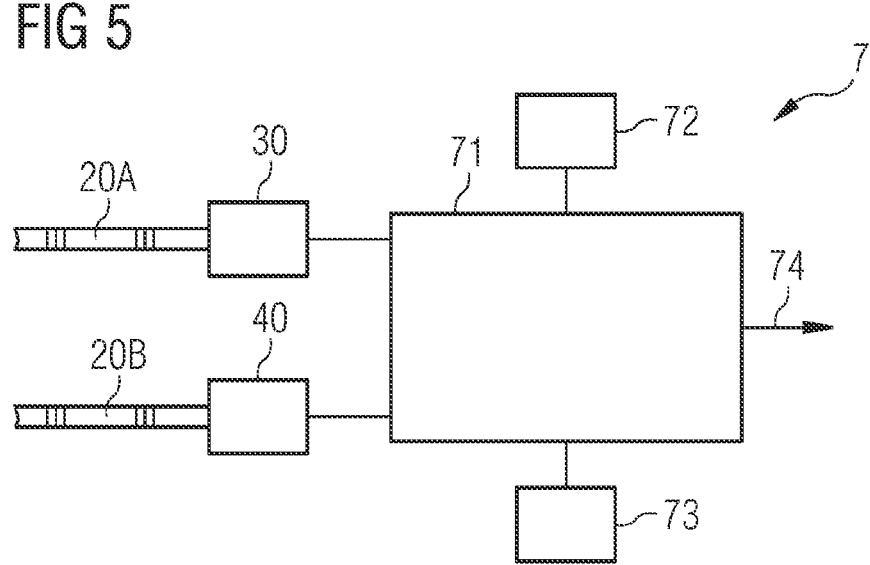
FIG. 5 shows a configuration of the leaky feeders and a processing unit according to an embodiment of the present invention.

FIG. 5 shows a configuration of the leaky feeders 20A, 20B and the processing unit 7 according to an embodiment of the present invention. The receiver converter 40 can be an Analog-to-Digital-converter (A/D). The reflected and analog second electromagnetic signal 200 can be received from the leaky feeder 20A and converted to an digital signal by the A/D-converter 40. The digital signal is then transmitted to a central processing unit (CPU) 71. The CPU 71 actually analyses the received second electromagnetic signal 200 and determines the wave characteristic of the sea level S based on the analysed second electromagnetic signal 200. The CPU 71 is further connected to storage means or storage such as a RAM 72 and a hard disk (HDD) 73. The CPU 71 is further connected to a communication unit (not shown) by which the determined wave characteristic of the sea level S can be transmitted to a control and/or monitoring system (not shown). The communication is made via wires, fibre optics or wireless.

Figure 6:
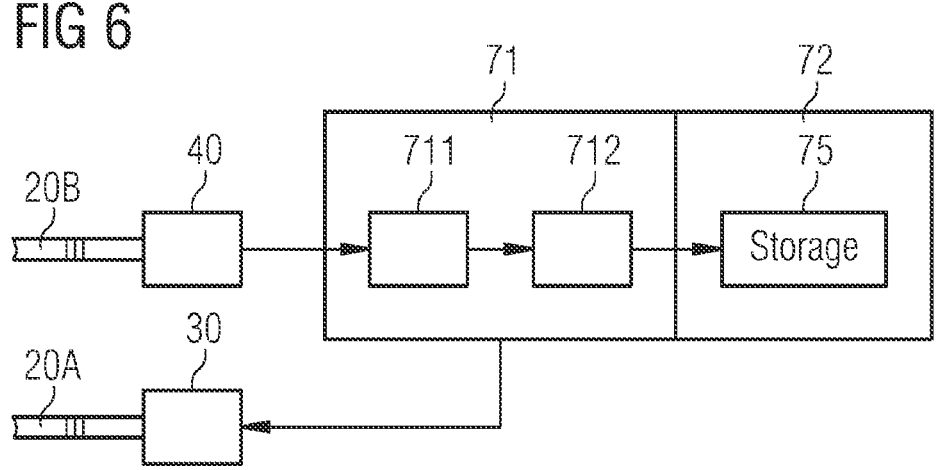
FIG. 6 shows a detail of the processing unit according to another embodiment of the present invention.

FIG. 6 shows a detail of the processing unit 7 according to another embodiment of the present invention. The CPU 71 comprises a filter 711, which filters the digital signal from the receiver converter 40, and a Fast-Fourier-Transformation unit (FFT unit) 712 which performs for example one or two fast Fourier-transformation operations of the filtered signal. The CPU 71 is further connected to a storage means or storage 75 and to the electromagnetic transmitter driver 30 of the transmitting leaky feeder 20A to control the same.

In addition or as an alternative to the FFT unit 712, a signal processing unit can be provided by which time domain and frequency domain data can be analysed to determine the wave characteristic of the sea level S.

The processing unit 7 is configured to determine at least one of a wind speed, a wind direction and a wind forecast from the determined wave characteristic of the sea level S.

The processing unit 7 is configured to determine a ship approximation condition from the determined wave characteristic of the sea level S, wherein the ship approximation condition is a condition that allows a ship to approximate the wind turbine 1. Then, a decision can made whether or not the ship is able to dock or land next to the wind turbine 1, for example with maintenance/service persons. For example, if the determined wave characteristic such as the wave height, the wave speed or the wind speed exceeds a predetermined threshold value, a decision is made that the ship is not allowed to approximate, to dock or to land next to the wind turbine 1. The processing unit 7 is configured to determine the ship approximation condition from the determined wave characteristic of the sea level S and in addition from a load of the ship. The processing unit 7 can be configured to determine a target distance between the wind turbine 1 and the ship from the determined wave characteristic of the sea level S. Based on the determined target distance between the wind turbine 1 and the ship, an automatic control of the distance between the wind turbine 1 and the ship can be implemented. Alternatively, the crew of the ship can be supported in navigating the ship by transmitting the determined target distance between the wind turbine 1 and the ship to the crew.

FIG. 7 shows a principle of analysing the reflected electromagnetic wave 200 such that the wave characteristic of the sea level S is determined according to an embodiment of the present invention. The wave characteristic of the sea level S is indirectly measured by the height of the waves of the sea level S around the wind turbine 1. The wind causes waves in the sea level S. The stronger the wind is, the higher the waves are and the distance between peaks of the waves increases. It has been found out that there is a correlation between the wind speed/wind direction and a direction of the reflected electromagnetic wave 200. In more detail, the electromagnetic wave 100, for example the radar signal 100, is reflected by the waves in the sea level S. A basic principle in determining the wave characteristic is schematically shown in FIG. 7 under use of the Bragg's law $2d \cdot \sin\theta = n \cdot \lambda$, where d is a distance between two peaks of waves of the sea level S, $\theta$ is a scattering angle of the reflected electromagnetic wave 200 with respect to a horizontal H, $\lambda$ is a wavelength of the electromagnetic wave 100, 200, and n is a positive integer which usually indicates a diffraction order.

The top view in FIG. 7 shows a condition of low wind, whereas the bottom top view in FIG. 7 shows a condition of strong wind. The top view in FIG. 7 shows reflection planes R of the sea level S having a smaller angle with respect to the horizontal H, whereas the top view in FIG. 7 shows reflection planes R of the sea level S having a larger angle with respect to the horizontal H. Based on the angle of the reflection planes R, the scattering angle $\theta$ is changed.

Depending on the distance of the waves d, the reflection angle of the reflected electromagnetic wave 200 with respect to the horizontal H is different. This effect is known as Bragg effect or Bragg reflection which can be used in the field of meteorology for a calculation of the wind speed or direction.

To calculate the wind speed and direction, first and second order Bragg peaks have to be investigated. The leaky feeder 20 itself operates in a frequency band, where the wave length $\lambda = c_0/f$ is in a range d as either a distance between two wave peaks or a peak-to-peak height of a wave of the sea level S. A multi-frequency radar and also a Doppler effect of moving waves in the sea level S can be used. To calculate the wind speed, the first order backscatter is used with $\lambda/2$ as wavelength. To estimate the wind direction, two first order scatters can be used. Typical frequencies of the electromagnetic wave 100 are 7.5 to 25 Mhz. This offers a range of some kilometres with sufficient power of the electromagnetic (radar) transmitter driver 30.

A frequency modulated interrupted continuous wave (FMIC) radar can be used for such type of weather radar.

C. ZHAO et. al., "*Wind direction measurements using HF ground wave radars based on a circular receive array*", published in 2017 Progress in Electromagnetics Research Symposium, Singapore 2017, discloses some more advanced measurement algorithms. For example, the wind direction can be calculated by the ratio of two first order Bragg reflections.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine which is configured to be disposed in or above a sea floor, the wind turbine comprising:
    a tower configured to protrude from a sea level and having a transmitter configured to transmit an electromagnetic wave to be reflected on the sea level and a receiver configured to receive the reflected electromagnetic wave, wherein at least one of the transmitter and the receiver includes a leaky feeder; and
    a processing unit being in communication with the receiver and configured to analyse the reflected electromagnetic wave such that a wave characteristic of the sea level is determined,
    wherein the processing unit is configured to use the Bragg's law $2d \cdot \cos\theta = n \cdot \lambda$ in determining the wave characteristic, wherein
    d is a distance between two wave peaks of the sea level,
    $\theta$ is a scattering angle of the reflected electromagnetic wave with respect to a horizontal (H),
    $\lambda$ is a wavelength of the electromagnetic wave, and
    n is a positive integer.
2. The wind turbine according to claim 1, wherein
    the leaky feeder is shaped as an arc extending around a circumference of the tower.
3. The wind turbine according to claim 1, wherein
    the transmitter comprises a first leaky feeder and the receiver comprises a second leaky feeder.
4. The wind turbine according to claim 1, wherein
    the processing unit is configured to determine at least one of a wind speed, a wind direction, a wind forecast and a ship approximation condition from the determined wave characteristic of the sea level, wherein the ship approximation condition is a condition that allows a ship to approximate or dock at the wind turbine.

5. The wind turbine according claim 4, wherein the processing unit is configured to determine the ship approximation condition from the determined wave characteristic of the sea level and from a load of the ship.

6. The wind turbine according to claim 1, wherein the processing unit is configured to determine a target distance between the wind turbine and a ship from the determined wave characteristic of the sea level.

7. A method of determining a wave characteristic of a sea level, the method comprising the following steps:
providing a tower of a wind turbine, which protrudes from a sea level, with a transmitter configured to transmit an electromagnetic wave to be reflected on the sea level and a receiver configured to receive the reflected electromagnetic wave, wherein at least one of the transmitter and the receiver comprises a leaky feeder;
analysing the reflected electromagnetic wave; and
determining a wave characteristic of the sea level based on the analysed, reflected electromagnetic wave,
wherein the wave characteristic is determined by use of the Bragg's law $2d \cdot \cos \theta = n \cdot \lambda$ in determining the wave characteristic, wherein
d is a distance between two wave peaks of the sea level,
$\theta$ is a scattering angle of the reflected electromagnetic wave with respect to a horizontal (H),
$\lambda$ is a wavelength of the electromagnetic wave, and
n is a positive integer.

8. The method according to claim 7, further comprising a step of:
determining at least one of a wind speed, a wind direction, a wind forecast and a ship approximation condition from the determined wave characteristic of the sea level, wherein the ship approximation condition is a condition that allows a ship to approximate or dock at the wind turbine.

9. The method according to claim 8, wherein
the ship approximation condition is determined from the determined wave characteristic of the sea level and from a load of the ship.

10. The method according to claim 7, further comprising a step of:
determining a target distance between the wind turbine and the ship from the determined wave characteristic of the sea level.

11. The method according to claim 7, wherein signals for the wave characteristics are directly measured by radar to obtain a 360° image around the wind turbine and/or its support structure.

12. The method according to claim 11, wherein the radar is one of synthetic aperture radar, SAR, and inverse synthetic-aperture radar, ISAR, algorithms.

13. The method according to claim 7, wherein a software defined radar, SDR, is used.

* * * * *